United States Patent
Kishino

(10) Patent No.: US 9,589,593 B2
(45) Date of Patent: Mar. 7, 2017

(54) MULTIPLE REREADING DATA FROM STORAGE MEDIUM USING WEIGHT AVERAGE

(71) Applicant: Kabushiki Kaisha Toshiba, Minato-ku, Tokyo (JP)

(72) Inventor: Keiichi Kishino, Chigasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/848,673

(22) Filed: Sep. 9, 2015

(65) Prior Publication Data
US 2016/0351227 A1    Dec. 1, 2016

Related U.S. Application Data

(60) Provisional application No. 62/169,212, filed on Jun. 1, 2015.

(51) Int. Cl.
| | |
|---|---|
| *G11B 5/09* | (2006.01) |
| *G11B 20/18* | (2006.01) |
| *G11B 27/36* | (2006.01) |
| *G11B 5/012* | (2006.01) |

(52) U.S. Cl.
CPC .......... *G11B 20/1879* (2013.01); *G11B 27/36* (2013.01); *G11B 5/012* (2013.01); *G11B 20/18* (2013.01); *G11B 20/1816* (2013.01)

(58) Field of Classification Search
None
See application file for complete search history.

(56) References Cited

U.S. PATENT DOCUMENTS

| | | | |
|---|---|---|---|
| 7,136,244 B1 * | 11/2006 | Rothberg | G11B 20/10037 360/31 |
| 7,900,125 B1 | 3/2011 | Liu et al. | |
| 9,147,419 B2 * | 9/2015 | Oberg | G11B 5/5965 360/53 |
| 9,251,856 B1 * | 2/2016 | Wheelock | G11B 27/36 360/53 |
| 2010/0007978 A1 * | 1/2010 | Fry | G11B 20/1816 360/31 |
| 2010/0095190 A1 | 4/2010 | Kanaya | |
| 2014/0029133 A1 * | 1/2014 | Tagami | G11B 21/106 360/75 |
| 2014/0281807 A1 | 9/2014 | Tashiro et al. | |

* cited by examiner

*Primary Examiner* — Tan X Dinh
(74) *Attorney, Agent, or Firm* — White & Case LLP

(57) ABSTRACT

According to one embodiment, in the case of rereading of data from a storage area of a storage is performed, data is read from the storage area a plurality of times, and a weighted average of pieces of the data read from the storage area the plurality of times is calculated, according to weights added to the pieces of data, as data reread from the storage area, in which the weights decreases as quality of the pieces of data read from the storage area decreases.

20 Claims, 11 Drawing Sheets

MULTIPLE REREADING DATA FROM STORAGE MEDIUM USING WEIGHT AVERAGE

CROSS-REFERENCE TO RELATED APPLICATIONS

This application is based upon and claims the benefit of priority from U.S. Provisional Application No. 62/169,212, filed on Jun. 1, 2015; the entire contents of which are incorporated herein by reference.

FIELD

Embodiments described herein relate generally to storage devices, controllers, and methods.

BACKGROUND

Recently, in rereading data in a storage area such as a sector in a hard disk drive (HDD), averaging retry has sometimes been performed. The averaging retry performs reading of sample values from a sector a plurality of times, calculates respective average values of the sample values obtained by reading the plurality of times, and obtains the calculated average values as data read from the sector. This allows for an attempt to demodulate data with reduced randomly-occurring noise in rereading the data from a sector.

When data written in a sector is damaged, or when a path of a head when data is written to a sector is different from a path of the head when the data is read from the sector, or when sampling of a read signal is failed, for example, quality of sample values read from the sector may be bad. Therefore, it has been required to optimize sample values used for acquiring data in the averaging retry.

DETAILED DESCRIPTION

According to the embodiments, there is provided a storage device that includes a storage and a controller that, in the case of performing rereading of data from a storage area of the storage, reads data from the storage area a plurality of times, and calculates a weighted average of pieces of the data read from the storage area the plurality of times, according to weights added to the pieces of data, as data reread from the storage area, in which the weights decreases as quality of the pieces of data read from the storage area decreases.

Hereinafter with reference to the accompanying drawings, storage devices, controllers, and methods according to the embodiments will be described in detail. These embodiments are not intended to limit the present invention.

First Embodiment

Figure 1:
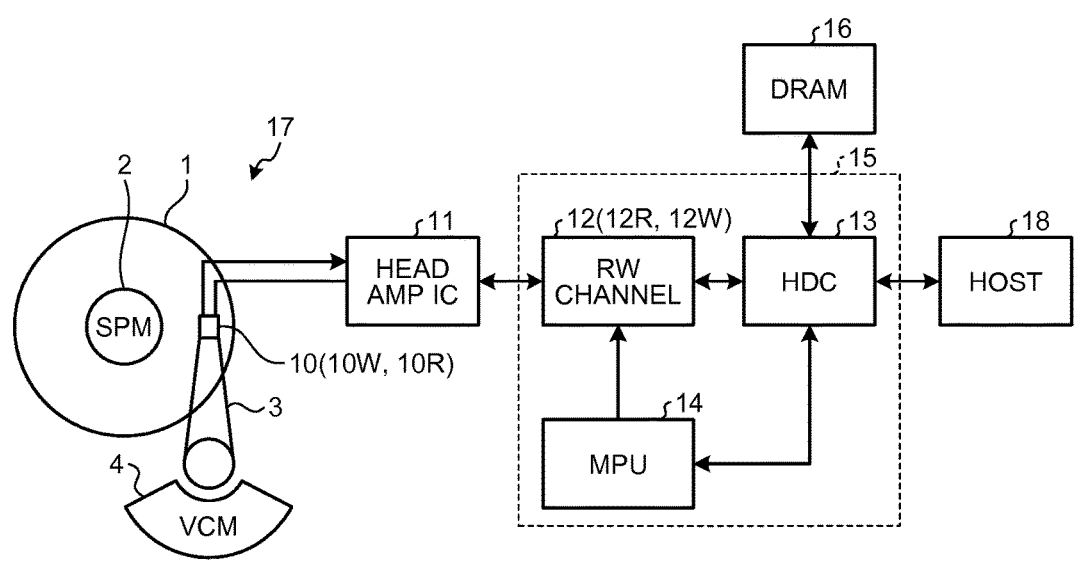
FIG. 1 is a diagram illustrating an example of a schematic configuration of a storage device according to a first embodiment.

FIG. 1 is a diagram illustrating an example of a schematic configuration of a disk storage device according to a first embodiment. As illustrated in FIG. 1, the disk storage device (an example of a storage device, hereinafter, written as a storage device) according to this embodiment includes a head disk assembly (HDA) 17, a head amplifier integrated circuit (hereinafter, referred to as a head amplifier IC) 11, and a system controller 15 formed by a one-chip integrated circuit.

The HDA 17 has a disk 1, an example of a storage, a spindle motor (SPM) 2, an arm 3 on which a head 10 is mounted, and a voice coil motor (VCM) 4. The disk 1 is rotated by the SPM 2. The arm 3 and the VCM 4 function as an actuator for driving the head 10. The VCM 4 moves the head 10 mounted on the arm 3 over the disk 1.

The head 10 has a write head 10W for writing data to a track on the disk 1 and a read head 10R for reading data from a track on the disk 1. The head amplifier IC 11 has a read amplifier and a write driver. The read amplifier amplifies data read by the read head 10R (hereinafter, referred to as read data), and outputs the amplified read data to a read/write (R/W) channel 12. The write driver supplies current corresponding to data output from the R/W channel 12 to the write head 10W (hereinafter, referred to as write data).

The system controller 15 has the R/W channel 12, a hard disk controller (HDC) 13, and a micro processing unit (MPU) 14. The R/W channel 12 has a read channel 12R and a write channel 12W. The read channel 12R performs signal processing on read data output from the read amplifier. The write channel 12W performs signal processing on write data to be written to the disk 1, and outputs it to the write driver.

The HDC 13 controls transfer of data between a host 18 and the R/W channel 12 (for example, read data and write data). The HDC 13 also controls dynamic random access memory (DRAM) 16, an example of buffer memory, to temporarily store read data and write data in the DRAM 16, and transfers read data and write data stored in the DRAM 16 to the host 18 or the R/W channel 12. The MPU 14 is a main controller of the storage device, and performs servo-control for controlling the VCM 4 to perform positioning of the head 10. The MPU 14 also controls signal processing on read data and write data in the R/W channel 12.

Further, the MPU 14 detects an error in reading of read data from the disk 1 (read error). When detecting a read error, the MPU 14 controls the HDA 17, the head amplifier IC 11, and the R/W channel 12 to perform averaging retry. Here, averaging retry is processing of performing reading of read data (hereinafter, referred to as sample values) from the disk 1 a plurality of times in the same manner as the above-described reading of read data, and generating an average value of the read sample values for each bit as read data reread from the disk 1 (hereinafter, referred to as sample values for recovery).

Figure 2:
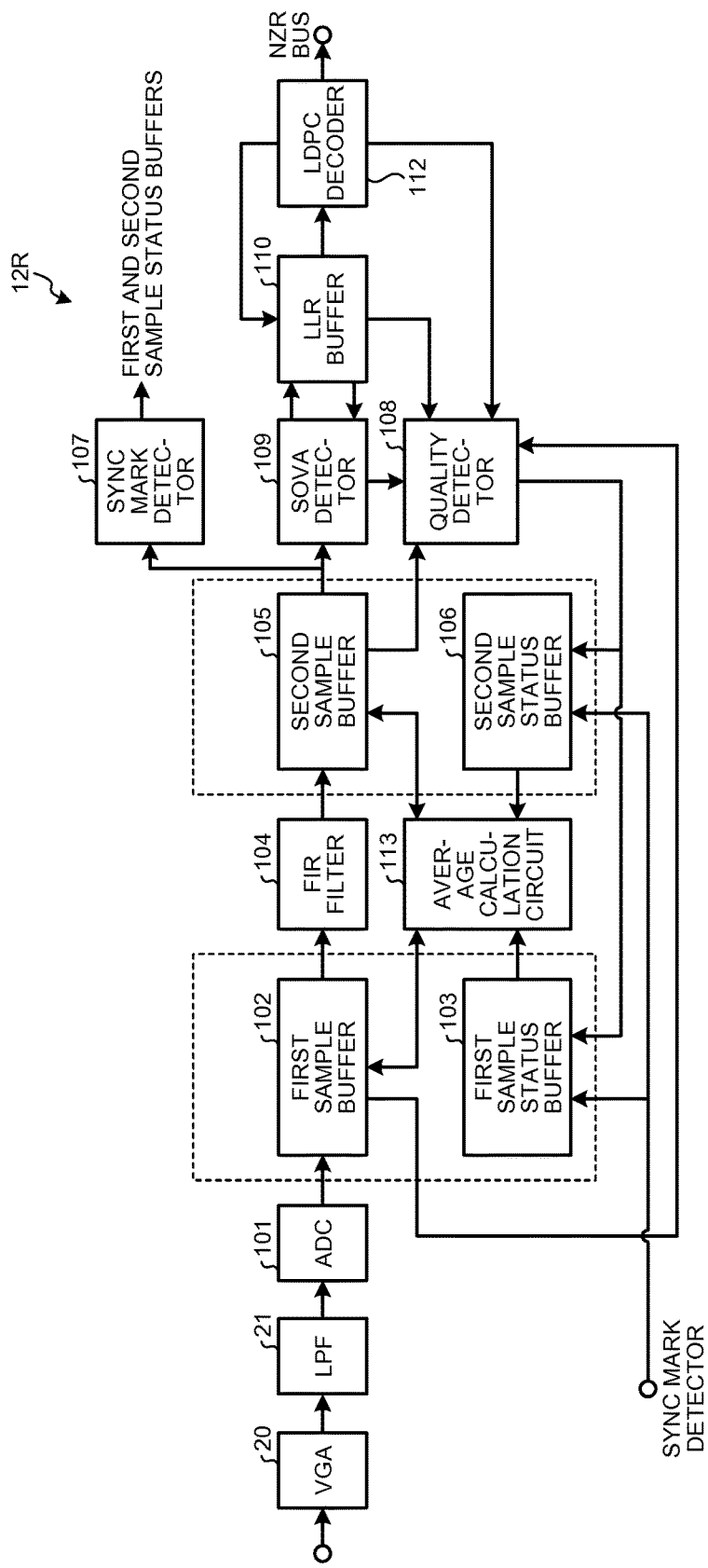
FIG. 2 is a block diagram illustrating an example of a functional configuration of a read channel in the storage device according to the first embodiment.

FIG. 2 is a block diagram illustrating an example of a functional configuration of a read channel in the storage device according to the first embodiment. As illustrated in FIG. 2, in this embodiment, the read channel 12R has a variable gain amplifier (VGA) 20, a low-pass filter (LPF) 21, and an analog-to-digital converter (ADC) 101. The VGA 20 amplifies a read signal input from the head amplifier IC 11. The LPF 21 is a filter that removes components more than or equal to the Nyquist frequency when a read signal is sampled. The ADC 101 (an example of a input circuit) is a converter that converts a read signal subjected to the above-described analog processing into sample values $x_{jk}$ and outputs them. Here, k is a bit number of a bit whose sample value is read, among bits constituting one sector. j is a read number indicating the order in which the sample value is read from the sector.

The read channel 12R (an example of a controller) includes a first sample buffer 102, a first sample status buffer 103, a finite impulse response (FIR) filter 104, a second sample buffer 105, a second sample status buffer 106, a sync mark detector 107, a quality detector 108, a soft output Viterbi algorithm (SOYA) detector 109, a log likelihood ratio (LLR) buffer 110, a low-density parity check (LDPC) decoder 112, and an average calculation circuit 113.

When instructed to perform averaging retry from the MPU 14, the first sample buffer 102 temporarily stores a plurality of sample values $x_{jk}$ of each sector output from the ADC 101 (hereinafter, such values $x_{jk}$ are referred to as a sample value sequence x). The first sample status buffer 103 (an example of a buffer) stores status information s and quality information q on the sample values $x_{jk}$. Here, status information s (an example of second information) is information about reading of sample values $x_{jk}$ such as whether or not a sync mark has been detected by the sync mark detector 107 described below when the sample values $x_{jk}$ are acquired. Quality information q is information indicating the quality of sample values $x_{jk}$ detected by the quality detector 108. The FIR filter 104 is a digital filter that performs waveform equalization processing on sample values $x_{jk}$ output from the ADC 101 so that sample values $x_{jk}$ have transfer characteristics determined by a partial response maximum likelihood (PRML) method.

The second sample buffer 105 temporarily stores sample values $y_{jk}$ obtained by performing the waveform equalization processing on the sample values $x_{jk}$ in the FIR filter 104. The second sample status buffer 106 (an example of a buffer) stores status information s and quality information q of the sample values $y_{jk}$. The sync mark detector 107 detects a sync mark contained in the sample values $y_{jk}$, and stores the sync mark detection result as a portion of the status information s in the first sample status buffer 103 and the second sample status buffer 106.

The quality detector 108 detects the quality of the sample values $x_{jk}$ stored in the first sample buffer 102, and stores the result of quality detection of the sample values $x_{jk}$ as quality information q in the first sample status buffer 103. The quality detector 108 also acquires the status information s about reading from a window $W_i$ of the sample values $x_{jk}$ stored in the first sample buffer 102, and stores the acquired status information s in the first sample status buffer 103. Here, a window $W_i$ is a storage area of a plurality of storage areas into which a sector of the disk 1 is divided. i is a number that allows identification of a plurality of windows W into which a sector is divided (hereinafter, referred to as a window index).

The quality detector 108 also detects the quality of the sample values $y_{jk}$ stored in the second sample buffer 105, and stores the result of quality detection of the sample values $y_{jk}$ as quality information $q_{ij}$ in the second sample status buffer 106. Further, the quality detector 108 acquires status information $s_{ij}$ about reading from a window $W_i$ of the sample values $y_{jk}$ stored in the second sample buffer 105, and stores the acquired status information $s_{ij}$ in the second sample status buffer 106. Here, the quality of the sample values $x_{jk}$ and $y_{jk}$ is calculated from numerical values representing the likelihood of the sample values $x_{jk}$ and $y_{jk}$, or the reliability of the sample values $x_{jk}$ and $y_{jk}$.

The SOVA detector 109 performs Viterbi decoding on the read data or the sample values $y_{jk}$ to obtain log likelihood ratios $u_{jk}$ of the read data or the sample values $y_{jk}$. Then, the SOVA detector 109 stores the log likelihood ratios $u_{jk}$ of the sample values $y_{jk}$ contained in the read data or the sample value sequence y (hereinafter, referred to as a log likelihood ratio sequence u) in the LLR buffer 110.

The LDPC decoder 112 outputs to the HDC 13 data on which error detection and correction such as a low-density parity check code has been performed with respect to the log likelihood ratio sequence u of the read data or the sample value sequence y (hereinafter, referred to as demodulated data).

The average calculation circuit 113 (an example of a calculation circuit) calculates a weighted average of the sample values $x_{jk}$, using the status information $s_{ij}$ and the quality information $q_{ij}$ stored in the first sample status buffer 103. The average calculation circuit 113 sets the calculated weighted average as data reread from the disk 1 (sample values X for recovery). Alternatively, the average calculation circuit 113 calculates a weighted average of the sample values $y_{jk}$, using the status information $s_{ij}$ and the quality information $q_{ij}$ stored in the second sample status buffer 106. Then, the average calculation circuit 113 sets the calculated weighted average as data reread from the disk 1 (sample values Y for recovery).

In this embodiment, averaging retry using the first sample buffer 102, the first sample status buffer 103, the second sample buffer 105, the second sample status buffer 106, the quality detector 108, and the average calculation circuit 113 is implemented by hardware of the read channel 12R. However, averaging retry may be implemented by extracting sample values $x_{jk}$ and $y_{jk}$, quality information $q_{ij}$, and status information $s_{ij}$ used for averaging retry in a storage device such as the DRAM 16, and performing firmware by a controller such as the MPU 14.

Figure 3:
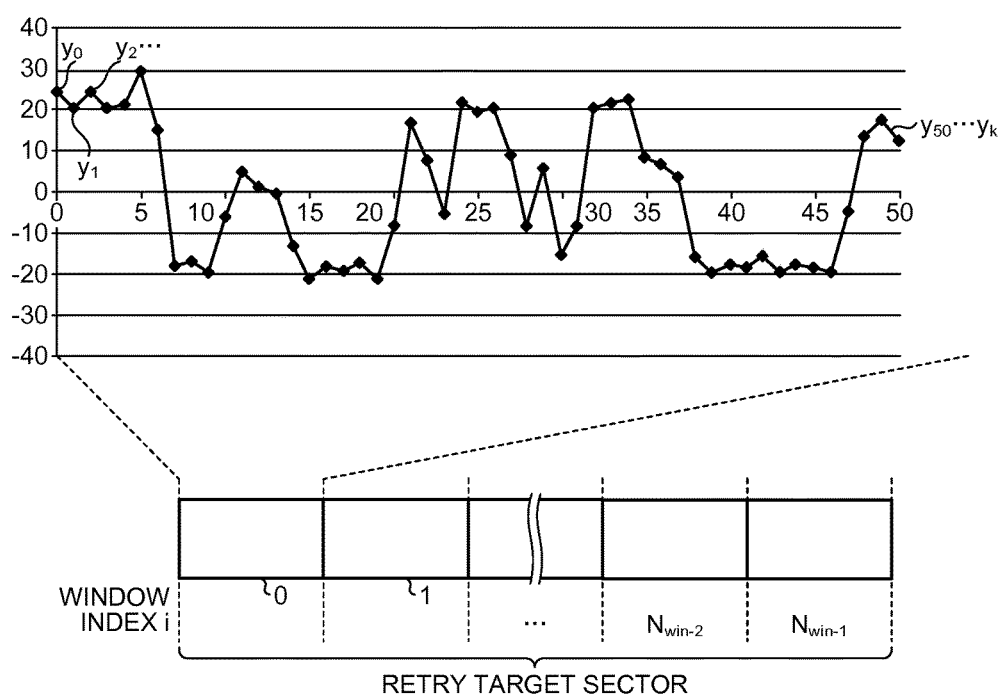
FIG. 3 is a diagram for illustrating an example of reading of sample values by averaging retry in the storage device according to the first embodiment.

Next, with reference to FIG. 3, reading of sample values $y_{jk}$ from the disk 1 by averaging retry will be described. FIG. 3 is a diagram for illustrating an example of reading of sample values by averaging retry in the storage device according to the first embodiment. In FIG. 3, the vertical axis represents sample values $y_{jk}$ and the horizontal axis represents numbers k of bits whose sample values $y_{jk}$ have been read.

In this embodiment, when performing averaging retry, as illustrated in FIG. 3, the MPU 14 divides a sector in which a read error has been detected among sectors of the disk 1 (hereinafter, referred to as a retry target sector) into a plurality of windows $W_i$, an example of a plurality of storage areas.

When instructed to perform averaging retry from the MPU 14, the HDA 17 performs reading of sample values $x_{jk}$ from each window $W_i$ a plurality of times (in this embodiment, a predetermined number of times $N_{ave}$, for example, eight times).

Then, the first sample buffer 102 stores the sample values $x_{jk}$ output from the ADC 101. The second sample buffer 105 stores sample values $y_{jk}$ obtained by the FIR filter 104 performing the waveform equalization processing on the sample values $x_{jk}$ as illustrated in FIG. 3.

Figure 4:
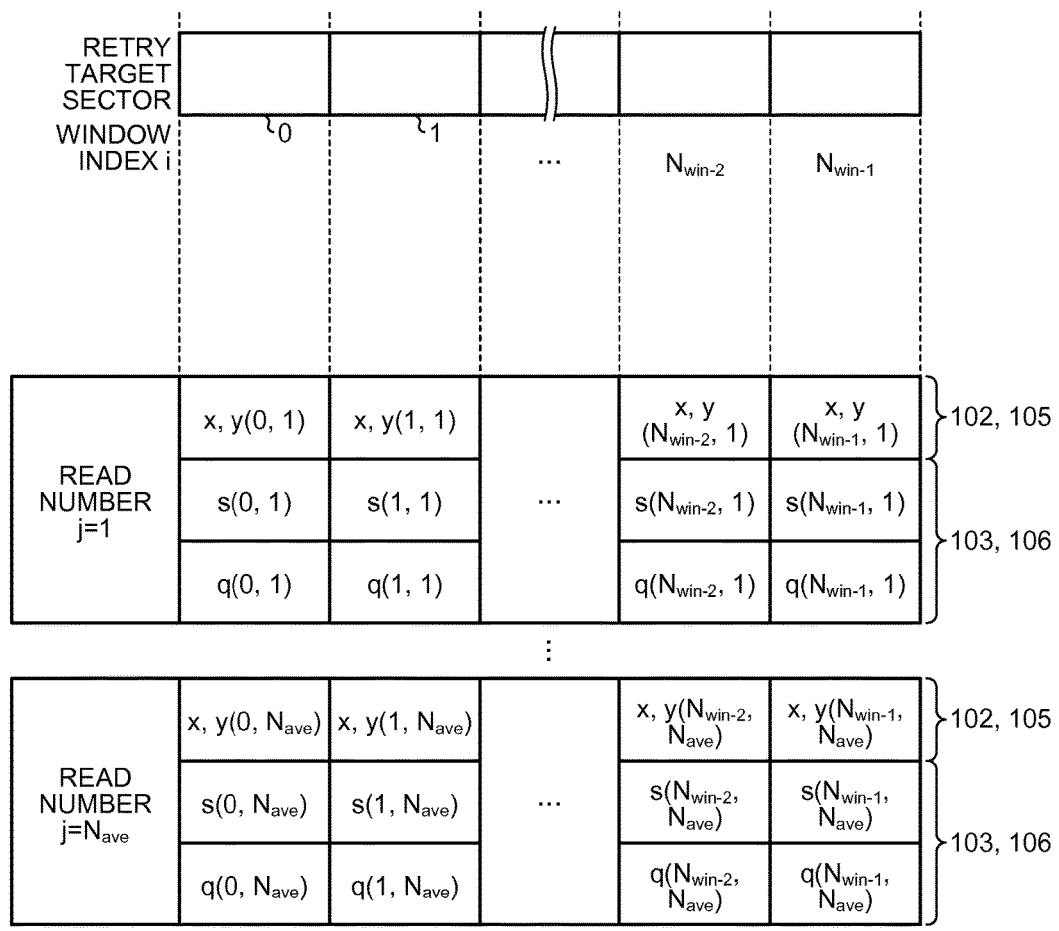
FIG. 4 is a diagram for illustrating an example of processing of storing sample values, status information, and quality information in the storage device according to the first embodiment.

Next, with reference to FIG. 4, processing of storing sample values $x_{jk}$, status information $s_{ij}$, and quality information $q_{ij}$ in the first sample buffer 102 and the first sample status buffer 103 will be described. FIG. 4 is a diagram for illustrating an example of processing of storing sample values, status information, and quality information in the storage device according to the first embodiment.

As illustrated in FIG. 4, the R/W channel 12 stores sample values $x_{jk}$ read from each window $W_i$ in the first sample buffer 102 with respect to sample values $x_{jk}$ with the same read numbers j (1 to $N_{ave}$). As illustrated in FIG. 4, the R/W channel 12 also stores status information $s_{ij}$ and quality information $q_{ij}$ of the sample values $x_{jk}$ read from each window $W_i$ in the first sample status buffer 103 with respect to status information $s_{ij}$ and quality information $q_{ij}$ with the same read numbers j.

As illustrated in FIG. 4, the R/W channel 12 also stores sample values $y_{jk}$ output from the FIR filter 104 in the second sample buffer 105 with respect to sample values $y_{jk}$ with the same read numbers j (1 to $N_{ave}$). As illustrated in FIG. 4, the R/W channel 12 also stores status information $s_{ij}$ and quality information $q_{ij}$ of the sample values $y_{jk}$ in the second sample status buffer 106 with respect to status information $s_{ij}$ and quality information $q_{ij}$ with the same read numbers j.

Figure 5A:
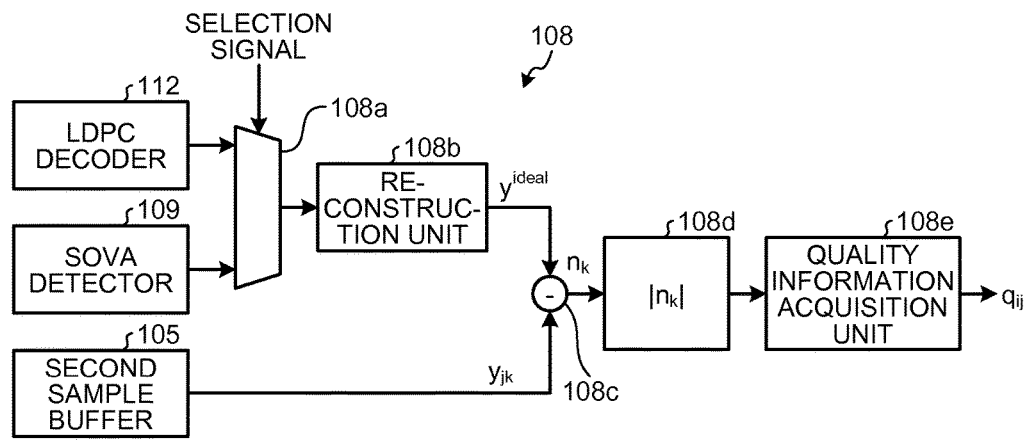
FIG. 5A is a diagram for illustrating an example of a method of calculating quality information in the storage device according to the first embodiment.

Next, with reference to FIG. 5A, a method of calculating quality information $q_{ij}$ of sample values $y_{jk}$ in the storage device according to this embodiment will be described. FIG. 5A is a diagram for illustrating an example of a method of calculating quality information in the storage device according to the first embodiment.

As illustrated in FIG. 5A, in this embodiment, the quality detector 108 has a selector 108a, a reconstruction unit 108b, a subtractor 108c, an absolute value calculator 108d, and a quality information acquisition unit 108e. The selector 108a outputs demodulated data output from the LDPC decoder 112 or a log likelihood ratio $u_{jk}$ obtained by the SOVA detector 109, according to a selection signal input from the MPU 14.

The reconstruction unit 108b outputs a value obtained by convolving demodulated data or a log likelihood ratio $u_{jk}$ output from the selector 108a with a predetermined partial response (PR) target, as a target value $y^{ideal}$ of the sample value $y_{jk}$. The subtractor 108c determines a difference $n_k$ by subtracting the sample value $y_{jk}$ stored in the second sample buffer 105 from the target value $y^{ideal}$.

The absolute value calculator 108d determines an absolute value $|n_k|$ of the difference $n_k$ determined by the subtractor 108c. The quality information acquisition unit 108e acquires the absolute value $|n_k|$ determined by the absolute value calculator 108d as quality information $q_{ij}$ of the sample value $y_{jk}$, and stores the quality information $q_{ij}$ in the second sample status buffer 106. When an absolute value $|n_k|$ is acquired as quality information $q_{ij}$, the quality of the sample value $y_{jk}$ decreases as the absolute value $|n_k|$ increases.

Figure 5B:
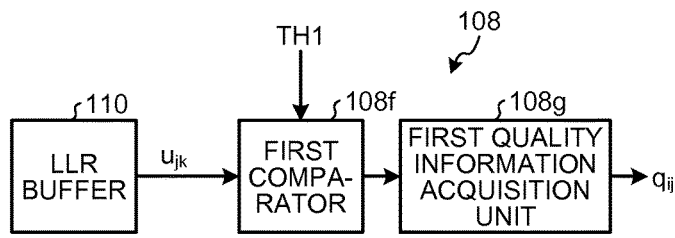
FIG. 5B is a diagram for illustrating an example of another method of calculating quality information in the storage device according to the first embodiment.

Next, with reference to FIG. 5B, another method of calculating quality information $q_{ij}$ of sample values $y_{jk}$ in the storage device according to this embodiment will be described. FIG. 5B is a diagram for illustrating an example of another method of calculating quality information in the storage device according to the first embodiment.

As illustrated in FIG. 5B, in this embodiment, the quality detector 108 may have a first comparator 108f and a first quality information acquisition unit 108g. Generally, the reliability (quality) of a sample value $y_{jk}$ increases as the absolute value $|u_k|$ of the log likelihood ratio $u_k$ of the sample value $y_{jk}$ increases.

Therefore, the first comparator 108f determines whether or not the absolute value $|u_{jk}|$ of the log likelihood ratio $u_{jk}$ of a sample value $y_{jk}$ obtained by the SOVA detector 109 falls below a predetermined threshold TH1. The first quality information acquisition unit 108g acquires the number of sample values $y_{jk}$ whose absolute values $|u_{jk}|$ exceed the threshold TH1, among the sample values $y_{jk}$ of the sample value sequence y, as quality information $q_{ij}$ of the sample values $y_{jk}$, and stores the acquired quality information $q_{ij}$ in the second sample status buffer 106.

Figure 5C:
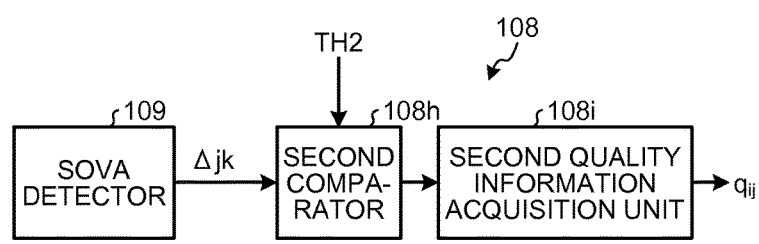
FIG. 5C is a diagram for illustrating an example of another method of calculating quality information in the storage device according to the first embodiment.

Next, with reference to FIG. 5C, another method of calculating quality information $q_{ij}$ of sample values $y_{jk}$ in the storage device according to this embodiment will be described. FIG. 5C is a diagram for illustrating an example of another method of calculating quality information in the storage device according to the first embodiment.

As illustrated in FIG. 5C, in this embodiment, the quality detector 108 may have a second comparator 108h and a second quality information acquisition unit 108i. Generally, the reliability (quality) of a sample value $y_{jk}$ increases as the difference Δjk between a path metric in Viterbi decoding on the sample value $y_{jk}$ by the SOVA detector 109 and a predetermined path metric increases.

Therefore, the second comparator 108h determines whether or not the absolute value |Δjk| of the difference Δjk of a sample value $y_{jk}$ is smaller than a predetermined threshold TH2. Then, the second quality information acquisition unit 108i acquires the number of bits whose absolute values |Δjk| are determined to be smaller than the second threshold TH2, among the sample values $y_{jk}$ of the sample value sequence y, as quality information $q_{ij}$ of the sample values $y_{jk}$, and stores the acquired quality information $q_{ij}$ in the second sample status buffer 106.

Figure 6:
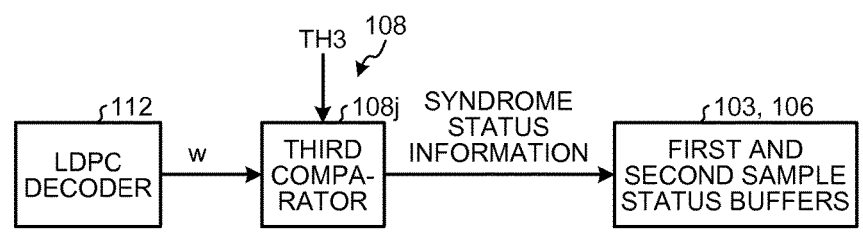
FIG. 6 is a diagram for illustrating an example of a method of obtaining status information in the storage device according to the first embodiment.

Next, with reference to FIG. 6, a method of acquiring status information $s_{ij}$ on sample values $y_{jk}$ in the storage device according to this embodiment will be described. FIG. 6 is a diagram for illustrating an example of a method of acquiring status information in the storage device according to the first embodiment.

As illustrated in FIG. 6, in this embodiment, the quality detector 108 has a third comparator 108*j*. Specifically, the third comparator 108*j* acquires a syndrome violation count w, the number of parity violations detected during error detection and correction on sample values $y_{jk}$ in the LDPC decoder 112. Then, the third comparator 108*j* determines whether or not the acquired syndrome violation count w exceeds a predetermined threshold TH3.

Generally, the syndrome violation count w increases as the quality of sample values $y_{jk}$ becomes worse. It is expected that the syndrome violation count w becomes a very great value when the alignment of signal samples deviates from normal bit positions, such as when a sync mark is falsely detected from sample values $y_{jk}$. To detect this, the threshold TH3 is set. Use of sample values $y_{jk}$ whose syndrome violation count w exceeds the threshold TH3 for averaging retry can lead to degradation of sample values Y for recovery obtained by the averaging retry. Thus sample values $y_{jk}$ whose syndrome violation count w exceeds the threshold TH3 are preferably not used for averaging retry.

Therefore, in this embodiment, when the syndrome violation count w exceeds the threshold TH3, the third comparator 108*j* stores, in the second sample status buffer 106, status information $s_{ij}$ containing syndrome status information: "1" that indicates the occurrence of an anomaly in reading of the sample values $y_{jk}$. On the other hand, when the syndrome violation count w is lower than or equal to the threshold TH3, the third comparator 108*j* stores, in the second sample status buffer 106, status information $s_{ij}$ containing syndrome status information: "0" that indicates the non-occurrence of an anomaly in reading of the sample values $y_{jk}$.

Although status information $s_{ij}$ containing syndrome status information is stored in the second sample status buffer 106 in this embodiment, status information $s_{ij}$ containing at least one of sync mark detection information indicating the result of sync mark detection by the sync mark detector 107, AFE information obtained from an analog front end (AFE), and syndrome status information may be stored in the first sample status buffer 103 and the second sample status buffer 106. Here, AFE information includes the presence or absence of detection of a thermal asperity (TA), the presence or absence of an anomaly in a timing loop, the presence or absence of an anomaly in preambles of sample values $x_{jk}$ and $y_{jk}$, the presence or absence of an overflow in automatic gain control (AGC), and so on.

Figure 7:
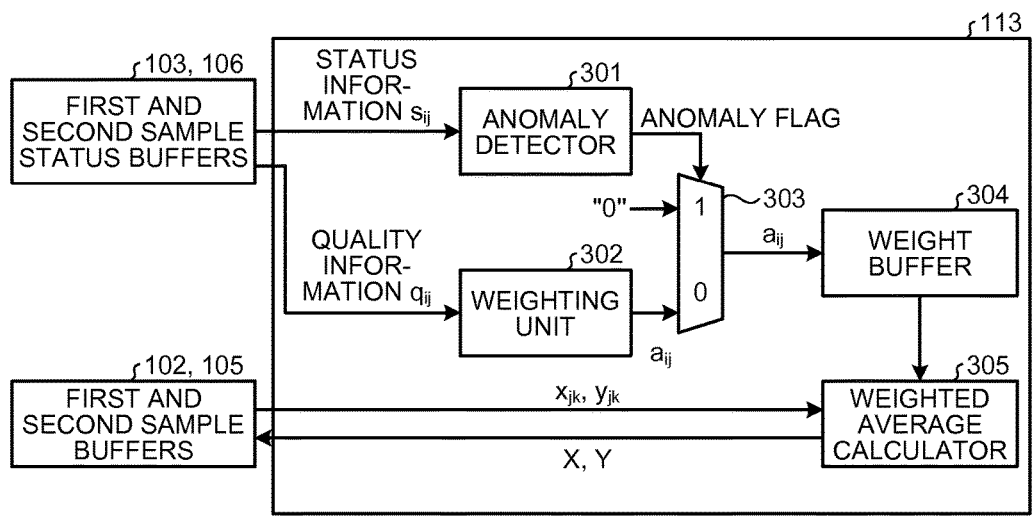
FIG. 7 is a diagram illustrating an example of a functional configuration of an average calculation circuit in the storage device according to the first embodiment.
Figure 8:
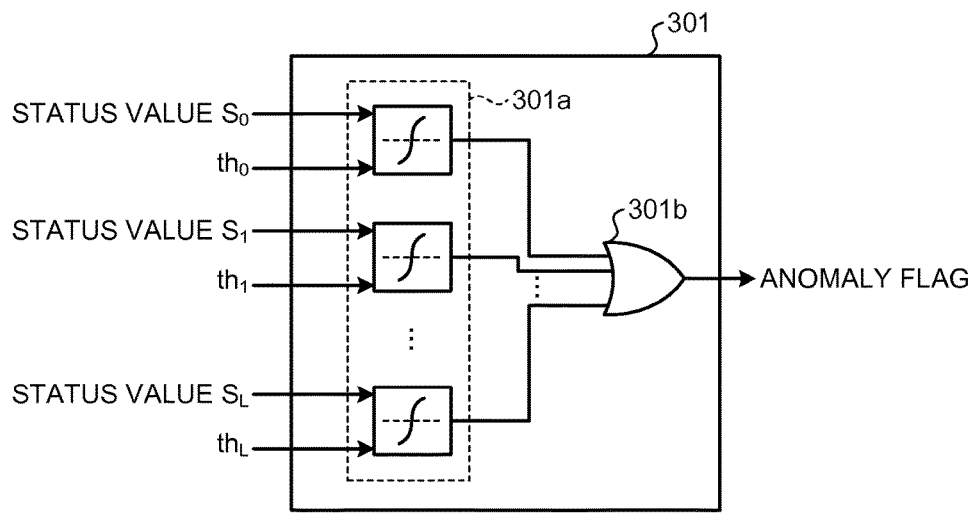
FIG. 8 is a diagram illustrating an example of a functional configuration of an anomaly detector in the storage device according to the first embodiment.
Figure 9:
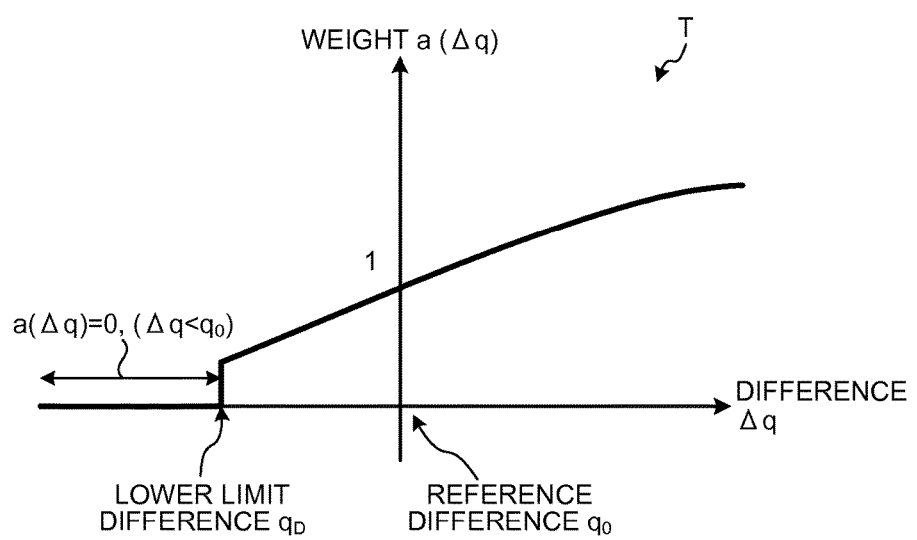
FIG. 9 is a diagram illustrating an example of a lookup table used for weighting sample values in the storage device according to the first embodiment.
Figure 10:
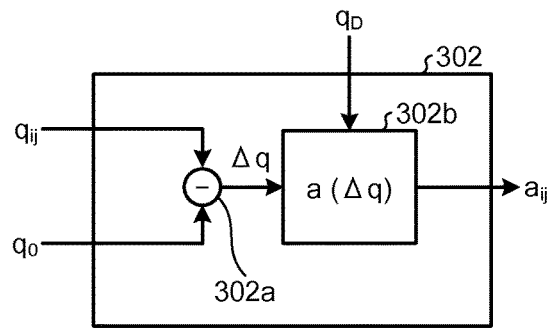
FIG. 10 is a diagram illustrating an example of a functional configuration of a weighting unit included in the storage device according to the first embodiment.

Next, with reference to FIGS. 7 to 10, calculation processing on read data by the average calculation circuit 113 in the storage device according to this embodiment will be described. FIG. 7 is a diagram illustrating an example of a functional configuration of an average calculation circuit in the storage device according to the first embodiment. FIG. 8 is a diagram illustrating an example of a functional configuration of an anomaly detector in the storage device according to the first embodiment. FIG. 9 is a diagram illustrating an example of a lookup table used for weighting on sample values in the storage device according to the first embodiment. FIG. 10 is a diagram illustrating an example of a functional configuration of a weighting unit included in the storage device according to the first embodiment. In the following description, an example of determining sample values X for recovery using sample values $x_{jk}$ will be described. A method of determining sample values Y for recovery using sample values $y_{jk}$ is the same.

In this embodiment, the average calculation circuit 113 has an anomaly detector 301, a weighting unit 302, a weight output unit 303, a weight buffer 304, and a weighted average calculator 305. The anomaly detector 301 first reads from the first sample status buffer 103 status information $s_{i1}$ on sample values $x_{1k}$ read from a window $W_i$ for the first time. Then, the anomaly detector 301 detects an anomaly in the reading of the sample values $x_{1k}$ read from the window $W_i$ for the first time, based on the read status information $s_{i1}$. On the reading of sample values $x_{jk}$ from the window $W_i$ for the second and subsequent times, the anomaly detector 301 also detects an anomaly in the reading of the sample values $x_{jk}$ in the same manner.

For example, when syndrome status information contained in the status information $s_{i1}$ indicates "1," the anomaly detector 301 detects the occurrence of an anomaly in the reading of the sample values $x_{1k}$. Then, the anomaly detector 301 outputs an anomaly flag indicating the occurrence of the anomaly in the reading of the sample values $x_{1k}$. On the other hand, when syndrome status information contained in the status information $s_{i1}$ indicates "0," the anomaly detector 301 determines that no anomaly has occurred in the reading of the sample values $x_{1k}$, and does not output an anomaly flag.

As illustrated in FIG. 8, the anomaly detector 301 may have a status comparator 301*a* and an OR circuit 301*b*. When a plurality of types of status values $S_0$ to $S_L$ is contained in status information s, the status comparator 301*a* compares the status values $S_0$ to $S_L$ with thresholds $th_0$ to $th_L$ associated with the status values $S_0$ to $S_L$, respectively. Here, the status values $S_0$ to $S_L$ are values related to statuses of reading of sample values $x_{jk}$ from a window $W_i$. Hereinafter, when it is not necessary to distinguish between the status values $S_0$ to $S_L$, the status values $S_0$ to $S_L$ are individually described as a status value S. In this embodiment, a status value S is a value that increases as the possibility that an anomaly has occurred in reading of sample values $x_{jk}$ increases. The thresholds $th_0$ to $th_L$ are upper limits of the status values S at which use for calculation of sample values X for recovery is allowed. When it is not necessary to distinguish between the thresholds $th_0$ to $th_L$, the thresholds $th_0$ to $th_L$ are individually described as a threshold th.

The OR circuit 301*b* outputs an anomaly flag when it is determined that at least one status value S has exceeded the threshold th. The threshold th may be a value that differs, depending on the type of the status value S, or may be the same value. The status value S input into the status comparator 301*a* may be a digital value "1, 0," or may be a continuous value (analog value).

Returning to FIG. 7, the weighting unit 302 reads from the first sample status buffer 103 quality information $q_{ij}$ on sample values $x_{jk}$ with a read number j read from a window $W_i$. Then, based on quality indicated by the read quality information $q_{ij}$, the weighting unit 302 adds a weight $a_{ij}$ to the corresponding sample value $x_{jk}$. At that time, the weighting unit 302 reduces the weight $a_{ij}$ to be added to the sample value $x_{jk}$ as the quality indicated by the quality information $q_{ij}$ decreases. Here, the weight $a_{ij}$ represents a weight a added to a sample value $x_{jk}$ with a read number j read from a window $W_i$ with a window index i.

As illustrated in FIG. 10, in this embodiment, the weighting unit 302 has a subtractor 302a and a weight adding unit 302b. The subtractor 302a determines a difference Δq by subtracting an absolute value $|n_k|$ as quality information $q_{ij}$ from a predetermined reference difference $q_0$. The weight adding unit 302b determines a weight $a_{ij}$ corresponding to the difference Δq determined by the subtractor 302a (that is, a weight to be added to a sample value $x_{jk}$).

For example, the weight adding unit 302b adds a weight $a_{ij}$ corresponding to the quality of a sample value $x_{jk}$ to the sample value $x_{jk}$, using a lookup table. Specifically, the weighting unit 302 stores a lookup table T (see FIG. 9) in which a difference Δq is associated with a weight a to be added to a sample value $x_{jk}$ with the difference Δq. As illustrated in FIG. 9, a weight $a_{ij}$ added to a sample value $x_{jk}$ is "1" at the reference difference $q_0$. The weight $a_{ij}$ increases as the difference Δq increases in a range greater than the reference difference $q_0$, and decreases as the difference Δq decreases in a range smaller than the reference difference $q_0$. When the difference Δq becomes smaller than a lower limit difference $q_D$, the lower limit of the difference Δq, the weight $a_{ij}$ becomes a predetermined weight (in this embodiment, "0"). The weight adding unit 302b sets a weight $a_{ij}$ (Δq) corresponding to a difference Δq determined by the subtractor 302a in the lookup table T as the weight $a_{ij}$ to be added to the sample value $x_{jk}$.

Returning to FIG. 7, the weight output unit 303 changes the weight $a_{ij}$ added to the sample value $x_{jk}$ by the weighting unit 302, based on the result of anomaly detection by the anomaly detector 301. In this embodiment, the weight output unit 303 sets a weight $a_{ij}$ added to a sample value $x_{jk}$ for which an anomaly flag has been output from the anomaly detector 301 to a predetermined weight (for example, "0"). The weight buffer 304 (an example of a third buffer) temporality stores the weight $a_{ij}$ added to each sample value $x_{jk}$ for each sample value $x_{jk}$.

The weighted average calculator 305 calculates, for each window $W_i$, a weighted average of a plurality of sample values $x_{jk}$ read from the window $W_i$, according to the weight $a_{ij}$ of each sample value $x_{jk}$ stored in the weight buffer 304. Then, the weighted average calculator 305 sets the calculated weighted average as sample values X for recovery reread from the window $W_i$.

In this embodiment, when determining a weighted average of sample values $x_{jk}$ read from a window $W_i$, the weighted average calculator 305 uses the following expression (1) to calculate sample values X for recovery. When determining a weighted average of sample values $y_{jk}$ read from a window $W_i$, the weighted average calculator 305 uses the following expression (2) to calculate sample values Y for recovery.

$$X = \frac{1}{\sum_{0}^{N_{ave}} a_{ij}} (a_{i1}x_{1k} + a_{i2}x_{2k} + \ldots + a_{iN_{ave}}x_{N_{avek}}) \quad (1)$$

$$Y = \frac{1}{\sum_{0}^{N_{ave}} a_{ij}} (a_{i1}y_{1k} + a_{i2}y_{2k} + \ldots + a_{iN_{ave}}y_{N_{avek}}) \quad (2)$$

When the weighted average calculator 305 has determined a weighted average of sample values $x_{jk}$, it stores sample values X for recovery in the first sample buffer 102. On the other hand, when the weighted average calculator 305 has determined a weighted average of sample values $y_{jk}$, it stores sample values Y for recovery in the second sample buffer 105.

When sample values X for recovery are stored in the first sample buffer 102, the FIR filter 104 performs the waveform equalization processing on the sample values X for recovery as on read data. The SOVA detector 109 performs the Viterbi decoding on the sample values X for recovery on which the waveform equalization processing has been performed by the FIR filter 104 or the sample values Y for recovery stored in the second sample buffer 105, to obtain log likelihood ratios $u_k$ of the sample values X for recovery or the sample values Y for recovery. The LDPC decoder 112 outputs to the HDC 13 data on which error detection and correction has been performed with respect to the log likelihood ratios $u_k$ of the sample values X for recovery or the sample values Y for recovery, as demodulated data.

Figure 11:
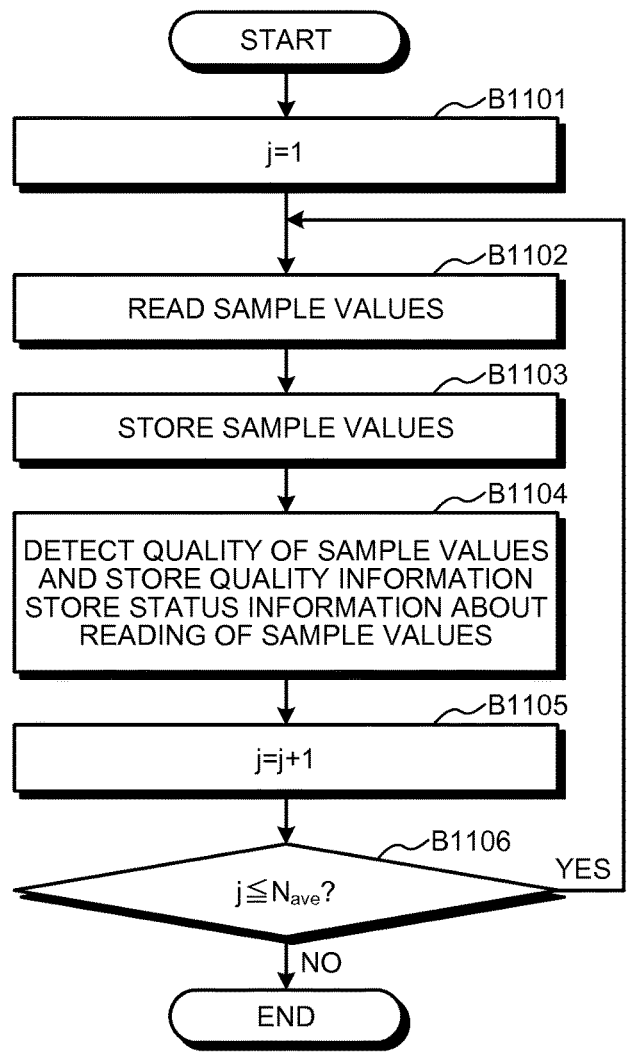
FIG. 11 is a flowchart illustrating an example of a processing flow of reading sample values in the storage device according to the first embodiment.

Next, with reference to FIG. 11, description will be given of a processing flow of storing sample values $x_{jk}$ or sample values y in the storage device according to this embodiment. FIG. 11 is a flowchart illustrating an example of a processing flow of reading sample values in the storage device according to the first embodiment.

When instructed to perform averaging retry from the MPU 14, the HDA 17 starts to read sample values $x_{jk}$ from each window $W_i$ of a retry target sector. Here, the read number j of reading sample values $x_{jk}$ from a window $W_i$ is "1" (B1101). Next, the HDA 17 performs reading of sample values $x_{1k}$ (for the first time) from the window $W_i$ (B1102).

When the sample values $x_{1k}$ are read by the HDA 17, and the sample values $x_{1k}$ converted into a digital signal is input from the ADC 101, the first sample buffer 102 stores the input sample values $x_{1k}$ (B1103). Thereafter, when sample values $y_{1k}$ on which the waveform equalization processing has been performed are output from the FIR filter 104, the second sample buffer 105 stores the input sample values $y_{1k}$ (B1103).

Next, the quality detector 108 detects the quality of the sample values $x_{1k}$ stored in the first sample buffer 102, and stores quality information $q_{i1}$ indicating the detected quality in the first sample status buffer 103 (B1104). The quality detector 108 also stores status information $s_{i1}$ about reading of the sample values $x_{1k}$ stored in the first sample buffer 102 in the first sample status buffer 103 (B1104).

Further, the quality detector 108 detects the quality of the sample values $y_{1k}$ stored in the second sample buffer 105, and stores quality information $q_{i1}$ indicating the detected quality in the second sample status buffer 106 (B1104). The quality detector 108 also stores status information $s_{i1}$ about reading of the sample values $y_{1k}$ stored in the second sample buffer 105 in the second sample status buffer 106 (B1104).

Next, the read number j of reading sample values x from the window $W_i$ is incremented (B1105). Further, the HDA 17 determines whether the incremented read number j reaches the predetermined number of times $N_{ave}$ or not (B1106). When the HDA 17 has determined that the read number j is lower than or equal to the predetermined number of times $N_{ave}$ (B1106: Yes), it returns to B1102 and again performs reading of sample values $x_{jk}$ (for the second and subsequent times) from the window $W_i$. On the other hand, when the read number j is more than the predetermined number of times $N_{ave}$ (B1106: No), the HDA 17 finishes reading of sample values $x_{jk}$ from the window $W_i$. The storage device repeats the processing illustrated in B1101 to B1106 on all windows $W_i$ of the retry target sector.

Figure 12:
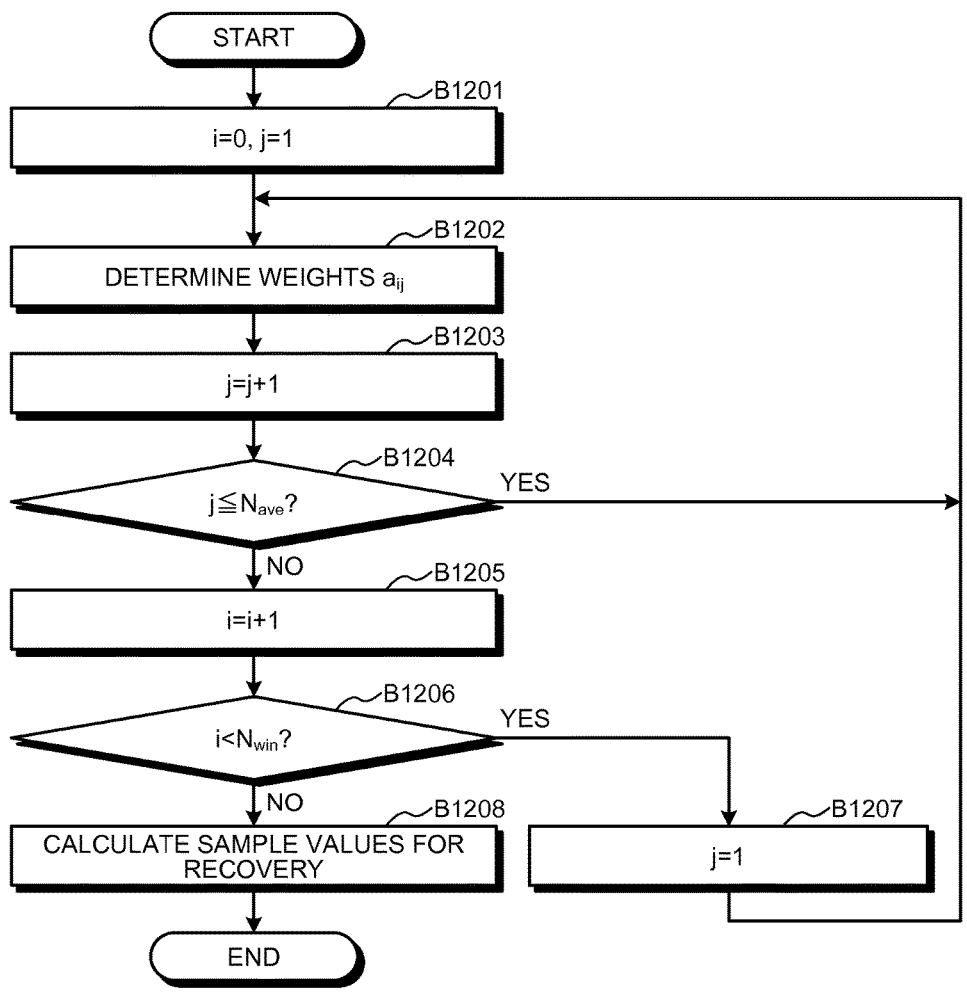
FIG. 12 is a flowchart illustrating an example of a processing flow of calculating sample values for recovery in the storage device according to the first embodiment.

Next, with reference to FIG. 12, description will be given of a processing flow of calculating sample values X for recovery or sample values Y for recovery in the storage device according to this embodiment. FIG. 12 is a flowchart illustrating an example of a processing flow of calculating sample values for recovery in the storage device according to the first embodiment. In the following description, an example of determining sample values Y for recovery using sample values $y_{jk}$ will be described. Determining sample values X for recovery using sample values $x_{jk}$ is the same.

When reading of sample values $x_{jk}$ from all the windows $W_i$ of the retry target sector a plurality of times has been finished, the average calculation circuit 113 sets, for sample values $y_{jk}$ to which weights $a_{ij}$ are added, the window index i of the windows $W_i$ to "0" and the read number j to "1" (B1201).

Next, the average calculation circuit 113 determines weights $a_{01}$ to be added to sample values $y_{01}$, based on quality information $q_{01}$ and status information $s_{01}$ on the sample values $y_{01}$ (B1202). The average calculation circuit 113 increments the read number j of the sample values y to which the weights $a_{01}$ are added (B1203). Next, the average value calculation circuit 113 determines whether the incremented read number j reaches the predetermined number of times $N_{ave}$ or not (B1204).

When the read number j is lower than or equal to the predetermined number of times $N_{ave}$ (B1204: Yes), the average calculation circuit 113 returns to B1202, and repeats the processing illustrated in B1202 to B1204 until determination of weights $a_{0Nave}$ on all sample values $y_{j1}$ read from the window $W_i$ is completed.

On the other hand, when the read number j is more than the predetermined number of times $N_{ave}$ (B1204: No), the average calculation circuit 113 increments the window index i (B1205). Subsequently, the average calculation circuit 113 determines whether or not the window index i is smaller than the number of windows $N_{win}$, the number of the windows $W_i$ into which the retry target sector is divided (B1206).

When the window index i is smaller than the number of windows $N_{win}$ (B1206: Yes), the average calculation circuit 113 sets the read number j of reading sample values $y_{jk}$ from the window $W_i$ with the window index i to "1," and returns to B1202 (B1207). Subsequently, the average calculation circuit 113 repeats the processing illustrated in B1202 to B1206 until addition of weights $a_{ij}$ to sample values $y_{jk}$ read from all the windows $W_i$ of the retry target sector is completed.

On the other hand, when the window index i is more than or equal to the number of windows $N_{win}$ (B1206: No), the average calculation circuit 113 calculates weighted averages of a plurality of sample values $y_{jk}$ read from each window $W_i$, according to the respective weights $a_{ij}$ added to the plurality of sample values $y_{jk}$, as sample values Y for recovery (B1208).

Figure 13:
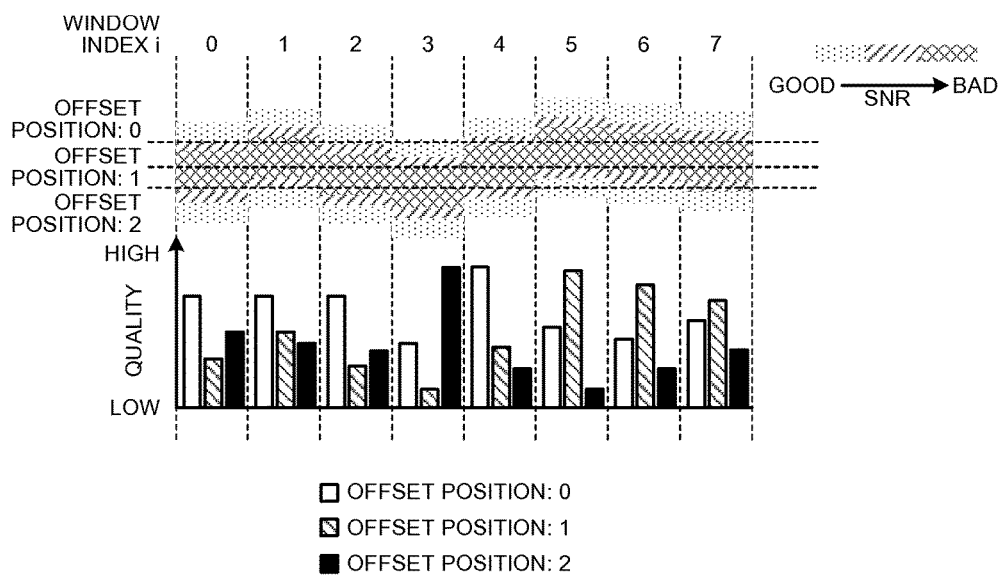
FIG. 13 is a diagram illustrating an example of quality of the sample values in the storage device according to the first embodiment.

Next, with reference to FIG. 13, an example of calculating sample values X for recovery or sample values Y for recovery in the storage device according to this embodiment will be described. FIG. 13 is a diagram illustrating an example of quality of the sample values by the storage device according to the first embodiment.

In reading from above the disk 1, when the path of the read head 10R deviates from the path of the write head 10W, or when the distance between adjacent tracks is not maintained constant, the position at which an optimal signal-to-noise ratio (SNR) is obtained in reading of read data can differ from window $W_i$ to window $W_i$ as illustrated in FIG. 13. In this case, the position of the read head 10R at which the quality of sample values $x_{jk}$ read from windows $W_i$ becomes high differs with respect to each window $W_i$ of a retry target sector. Therefore, the storage device according to this embodiment performs averaging retry, offsetting the position of the read head 10R between, for example, three offset positions: 0 to 2 when sample values $x_{jk}$ are read from a retry target sector.

Thus, averaging retry is performed, taking into account the weights $a_{ij}$ of sample values $x_{jk}$ or sample values $y_{jk}$ of good quality among sample values $x_{jk}$ or sample values $y_{jk}$ read from windows $W_i$ while the position of the read head 10R is being offset. Therefore, the storage device according to this embodiment can obtain sample values X for recovery or sample values Y for recovery with quality better than that of read data obtained by performing averaging retry without changing the position of the read head 10R.

According to the first embodiment, when averaging retry is performed, the weights $a_{ij}$ added to sample values $x_{jk}$ or sample values $y_{jk}$ read from a window $W_i$ are reduced as the quality of the sample values $x_{jk}$ or the sample values $y_{jk}$ decreases. As a result, sample values X for recovery or sample values Y for recovery can be obtained, placing weight on sample values $x_{jk}$ or sample values $y_{jk}$ of good quality, thus providing an effect that the success rate of recovery when a read error occurs can be improved.

Here, an example of applying the storage device, the controller, and the method according to the embodiment to a storage device has been described. The storage device, the controller, and the method according to the embodiment can be applied to a storage device that performs averaging retry (for example, a solid state drive (SSD) or the like), like the storage device.

Second Embodiment

The second embodiment is an example of performing averaging retry with an interleaved sector (or long sector), a storage area in which a plurality of sectors are interleaved, as a single window. In the following description, portions similar to those in the first embodiment will not be described.

Figure 14:
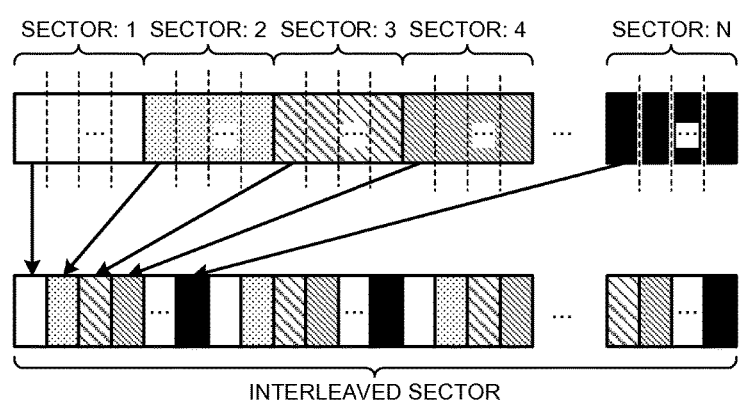
FIG. 14 is an illustrative diagram for illustrating an example of data reading or writing in a storage device according to a second embodiment.
Figure 15:
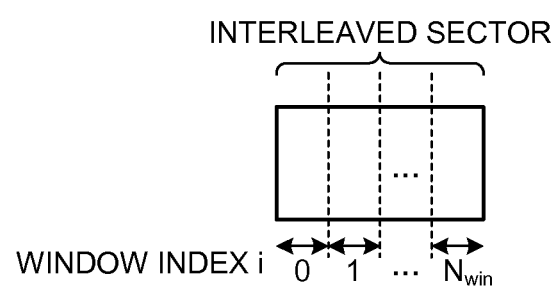
FIG. 15 is a diagram for illustrating an example of reading of sample values from windows in the storage device according to the second embodiment.

FIG. 14 is an illustrative diagram for illustrating an example of reading or writing of data in a storage device according to the second embodiment. FIG. 15 is a diagram for illustrating an example of reading of sample values from windows in the storage device according to the second embodiment. As illustrated in FIG. 14, an HDA 17 of the storage device according to this embodiment performs reading of read data from a disk 1 and writing of write data to the disk 1 in units of interleaved sectors into which a plurality of sectors: 1 to N is interleaved.

When an interleaved sector includes N sectors, the sectors constituting the single interleaved sector is dispersed and arranged in a range of N on the disk 1. Therefore, when the path of a read head 10R deviates from the path of a write head 10W on the disk 1, the quality of read data read by the HDA 17 is greatly affected.

Therefore, the storage device according to this embodiment performs averaging retry with each sector of an interleaved sector as a single window $W_i$. Consequently, in reading of sample values $x_{jk}$ from the disk 1, even when the quality of sample values $x_{jk}$ or sample values $y_{jk}$ decreases with the read head 10R not moved to a position at which an optimal SNR is obtained, averaging retry is performed, taking into account the weights of sample values $x_{jk}$ or sample values $y_{jk}$ of good quality, and thus sample values X for recovery or sample values Y for recovery of good quality can be obtained.

Here, details of processing of calculating sample values X for recovery or sample values Y for recovery of a window $W_i$, each sector of the interleaved sector, will not be described. An average calculation circuit 113 calculates sample values X for recovery or sample values Y for recovery of a window $W_i$ in the same manner as in the first embodiment.

According to the second embodiment, averaging retry is performed with each sector of an interleaved sector as a single window $W_i$. As a result, averaging retry is performed, taking into account weights $a_{ij}$ of sample values $x_{jk}$ or sample values $y_{jk}$ of good quality, thus being able to provide an effect that sample values X for recovery or sample values Y for recovery of good quality can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
a storage; and
a controller, wherein
the controller, in the case of performing rereading of data from a storage area of the storage, reads data from the storage area a plurality of times, and calculates a weighted average of pieces of the data read from the storage area the plurality of times, according to weights added to the pieces of data, as data reread from the storage area, the weights decreasing as quality of the pieces of data read from the storage area decreases.

2. The storage device of claim 1 further comprising a buffer that stores information indicating quality of the pieces of data read from the storage area,
wherein the controller performs weighting on the pieces of data, based on the information of the pieces of data stored in the buffer.

3. The storage device of claim 1 further comprising a buffer that stores information about reading of the pieces of data from the storage area,
wherein the controller changes the weights added to the pieces of data, based on a result of anomaly detection in reading of the pieces of data from the storage area, the result being based on the information of the pieces of data stored in the buffer.

4. The storage device of claim 3, wherein the controller detects an anomaly in reading of data from the storage area, based on the information stored in the buffer, and changes the weight added to the data, based on a result of the anomaly detection.

5. The storage device of claim 3, wherein the controller sets the weight added to data on which an anomaly in reading of the data from the storage area has been detected, to zero.

6. The storage device of claim 1, wherein the controller obtains the weight to be added to data read from the storage area, using a lookup table.

7. The storage device of claim 1 further comprising a buffer that stores the weights added to the pieces of data read from the storage area for the pieces of data,
wherein the controller calculates a weighted average of the pieces of data read from the storage area, according to the weights on the pieces of data stored in the buffer.

8. The storage device of claim 1, wherein
the storage is a disk, and
the storage area is one of a plurality of storage areas into which a sector of the disk is divided.

9. The storage device of claim 1, wherein
the storage is a disk, and
the storage area is a storage area in which a plurality of sectors of the disk is interleaved.

10. A controller comprising:
An input circuit input pieces of data read from a storage area of a storage a plurality of times; and
A calculation circuit calculates a weighted average of the pieces of the data read from the storage area the plurality of times, according to weights added to the pieces of data, as data reread from the storage area, the weights decreasing as quality of the pieces of data read from the storage area decreases.

11. The controller of claim 10, wherein the calculation circuit performs weighting on the pieces of data, based on information of the pieces of data stored in a buffer, the information indicating quality of the pieces of data read from the storage area.

12. The controller of claim 10, wherein the calculation circuit changes the weights added to the pieces of data, based on a result of anomaly detection in reading of the pieces of data from the storage area, the result being based on information of the pieces of data stored in a buffer, the information being about reading of the pieces of data from the storage area.

13. The controller of claim 12, wherein the calculation circuit detects an anomaly in reading of data from the storage area, based on the information, and changes the weight added to the data, based on a result of the anomaly detection.

14. The controller of claim 12, wherein the calculation circuit sets the weight added to data on which an anomaly in reading of the data from the storage area has been detected, to zero.

15. The controller of claim 10, wherein the calculation circuit obtains the weight corresponding to the quality of data read from the storage area, using a lookup table.

16. The controller of claim 10, wherein the calculation circuit calculates a weighted average of the pieces of data read from the storage area, according to the weights on the pieces of data stored in a buffer, the weights being stored in the buffer for the pieces of data read from the storage area.

17. A method comprising:
reading data from a storage area of a storage a plurality of times in the case of performing rereading of data from the storage area; and
calculating a weighted average of pieces of the data read from the storage area the plurality of times, according to weights added to the pieces of data, as data reread from the storage area, the weights decreasing as quality of the pieces of data read from the storage area decreases.

18. The method of claim 17 further comprising performing weighting on the pieces of data, based on information indicating quality of the pieces of data stored in a buffer.

19. The method of claim 17 further comprising changing the weights added to the pieces of data, based on a result of anomaly detection in reading of the pieces of data from the storage area, the result being based on information about reading of the pieces of data stored in a buffer.

20. The method of claim 17 further comprising obtaining the weight corresponding to quality of the data read from the storage area, using a lookup table.

\* \* \* \* \*